United States Patent
Ogunniyi et al.

(10) Patent No.: US 11,584,822 B2
(45) Date of Patent: Feb. 21, 2023

(54) POLYURETHANE-POLYISOCYANURATE FOAM

(71) Applicant: Dow Global Technologies LLC, Midland, MI (US)

(72) Inventors: Adebola O. Ogunniyi, Missouri City, TX (US); Aiping Hu, Wilmington, NC (US); Kaoru Aou, Lake Jackson, TX (US); Robert S. York, Houston, TX (US); Melissa M. Rose, Marietta, GA (US); Arne Anderson, Winnepeg (CA); David K. Mulkey, Suwanee, GA (US)

(73) Assignee: Dow Global Technologies LLC, Midland, MI (US)

( * ) Notice: Subject to any disclaimer, the term of this patent is extended or adjusted under 35 U.S.C. 154(b) by 9 days.

(21) Appl. No.: 17/051,858

(22) PCT Filed: Jun. 3, 2019

(86) PCT No.: PCT/US2019/035177
§ 371 (c)(1),
(2) Date: Oct. 30, 2020

(87) PCT Pub. No.: WO2019/236465
PCT Pub. Date: Dec. 12, 2019

(65) Prior Publication Data
US 2021/0189056 A1    Jun. 24, 2021

Related U.S. Application Data

(60) Provisional application No. 62/680,883, filed on Jun. 5, 2018.

(51) Int. Cl.
| | | |
|---|---|---|
| *C08G 18/09* | (2006.01) | |
| *C08G 18/16* | (2006.01) | |
| *C08G 18/18* | (2006.01) | |
| *C08G 18/22* | (2006.01) | |
| *C08G 18/48* | (2006.01) | |
| *C08G 18/76* | (2006.01) | |
| *C08G 101/00* | (2006.01) | |

(52) U.S. Cl.
CPC ....... *C08G 18/7664* (2013.01); *C08G 18/092* (2013.01); *C08G 18/225* (2013.01); *C08G 18/4812* (2013.01); *C08G 18/4825* (2013.01); *C08G 2101/00* (2013.01); *C08G 2110/005* (2021.01); *C08G 2110/0025* (2021.01); *C08G 2115/02* (2021.01)

(58) Field of Classification Search
None
See application file for complete search history.

(56) References Cited

U.S. PATENT DOCUMENTS

| | | | |
|---|---|---|---|
| 3,931,065 A | | 1/1976 | Ashida |
| 4,311,801 A | * | 1/1982 | Skowronski ............ B32B 27/40 428/304.4 |
| 4,382,125 A | * | 5/1983 | Narayan ............ C08G 18/3206 521/160 |
| 6,433,032 B1 | | 8/2002 | Hamilton |
| 7,943,679 B2 | | 5/2011 | DeVos |
| 2003/0119929 A1 | * | 6/2003 | Bicknell ............... C08G 18/792 521/99 |
| 2004/0069971 A1 | | 4/2004 | Witteveeen |
| 2015/0354220 A1 | * | 12/2015 | Nandi .................... C08G 18/42 52/309.9 |

FOREIGN PATENT DOCUMENTS

| | | | | |
|---|---|---|---|---|
| EP | 1167414 A | | 1/2002 | |
| GB | 2025438 A | * | 1/1980 | ........... C08G 18/022 |
| WO | 2004/111101 A | | 12/2004 | |
| WO | 2012/027113 A | | 3/2012 | |

* cited by examiner

*Primary Examiner* — Melissa A Rioja

(57) ABSTRACT

Polyurethane-polyisocyanurate foams are prepared using a polyether polyol made from an alkylene oxide mixture that contains a specified proportion of ethylene oxide. The selection of proper polyol equivalent weight and ethylene oxide content leads to the production of foams having a useful combination of properties.

11 Claims, No Drawings

POLYURETHANE-POLYISOCYANURATE FOAM

This invention relates to polyurethane-polyisocyanurate foam that is suitable as foam boardstock for roofing and other construction applications.

Polyurethane-polyisocyanurate foams are useful thermal insulating materials in building applications due to their ability to be formed into rigid boardstock, their fire resistance and their thermal insulation capabilities. They perform well even when manufactured at densities well below 30 kg/m$^3$.

Polyisocyanurate foams are made by performing a trimerization reaction on a polyisocyanate in the presence of a blowing agent. The incorporation of urethane linkages imparts added compressive strength and reduces friability. Urethane linkages are formed by adding one or more polyols to the foam formulation.

The thermal properties of polyurethane-polyisocyanurate foam are somewhat temperature-dependent. The foam tends to have better k-factor (thermal resistance) at approximately room temperature 24° C. (75° F.), than at lower temperatures. The k-factor of these foams can be 10% or more greater at 4° C. (40° F.) than at 24° C. Even greater loss of k-factor is seen at lower temperatures.

The polyurethane-polyisocyanurate foams therefore perform better when the temperature on each side of the foam insulation is somewhat high, such as during the summer air conditioning season where the temperature on each side of a building insulation layer is typically 20° C. or more. These foams perform less well when the temperature on one or both sides of the insulation layer is lower, as is the case with insulation used in refrigerated areas or in buildings during the winter heating season. Better low temperature insulation performance is wanted for polyurethane-isocyanurate foams that are used for insulating buildings in colder climates and/or for insulating cold storage facilities and appliances. Foam used as building insulation should exhibit a low k-factor across a wide temperature range so good thermal performance is seen across the seasonal variations in outside temperature.

In one aspect, this invention is a polyurethane-polyisocyanurate foam that is a reaction product of a reaction mixture comprising one or more isocyanate-reactive materials, a polyisocyanate component, a physical blowing agent, a foam-stabilizing surfactant, at least one trimerization catalyst and at least one catalyst for the reaction of an isocyanate group towards water, wherein:

a) greater than 70% by weight of the isocyanate-reactive materials is at least one polyether polyol having a hydroxyl equivalent functionality of at least 3 and a hydroxyl equivalent weight of at least 100 but less than 400, wherein the at least one polyether polyol is selected from homopolymers of ethylene oxide, copolymers of ethylene oxide and propylene oxide and homopolymers of propylene oxide and the at least one polyether polyol has an average oxyethylene content of greater than 40% but less than 80% by weight and correspondingly an average oxypropylene content at least 20% but less than 60% by weight based on the combined weight of oxyalkylene groups present in the at least one polyether polyol, provided that when the at least one polyether polyol has an average hydroxyl equivalent weight greater than 200, the isocyanate-reactive materials further include at least one crosslinker having a hydroxyl functionality of at least 3 and a hydroxyl equivalent weight of less than 100 such that the equivalent weight of the at least one polyether polyol and the at least one crosslinker combined is less than 200;

b) less than 25% by weight of the isocyanate-reactive materials is a polyester polyol;

c) water constitutes no more than 0.5% of the weight of the isocyanate-reactive materials;

d) the polyisocyanate component includes one or more aromatic polyisocyanates, the one or more aromatic polyisocyanates having an average isocyanate functionality of at least 2.7 and an average isocyanate equivalent weight of up to 150;

e) the isocyanate index is 200 to 400; and f) the reaction mixture contains 3 to 9 parts by weight, per 100 parts by weight of the isocyanate-reactive materials, of the at least one trimerization catalyst.

The foam of the invention surprisingly exhibits a k-factor at 4° C. that is very close to or even lower than its k-factor at 24° C. This benefit is achieved while simultaneously achieving suitably low product densities and adequate compression strength.

At least 70% by weight of the isocyanate-reactive materials is at least one polyether polyol that has a functionality of at least 3 and a hydroxyl equivalent weight of at least 100 but less than 400.

The polyether polyol(s) having a functionality of at least 3 and a hydroxyl equivalent weight of at least 100 but less than 400 may constitute at least 75%, at least 80%, at least 85%, at least 90% or at least 92% of the total weight of the isocyanate-reactive materials. It may constitute up to 95%, up to 98% or up to 100% thereof.

Each of the polyether polyols has a hydroxyl functionality of at least 3. The functionality of each may be as great as 8. A preferred hydroxyl functionality is 3 to 6 or 3 to 4.

The hydroxyl equivalent weight of each of the polyether polyol(s) is at least 100 but less than 400. It is preferably at least 120 or at least 130, and is preferably up to 350, up to 250, up to 200, up to 175, up to 165 or up to 155. Equivalent weights for purposes of this invention are measured by determining the hydroxyl number of the polyol by titration and converting the hydroxyl number to equivalent weight by dividing 56,100 by the hydroxyl number.

The polyether polyol is selected from homopolymers of ethylene oxide, copolymers of ethylene oxide and propylene oxide and homopolymers of propylene oxide. The polyether polyol (when a single polyol is used) or polyether polyols (when a mixture of two or more polyols is used) has an average oxyethylene content of greater than 40% but less than 80% by weight. The average oxyethylene content may be at least 50% and no greater than 70%. Correspondingly the average oxypropylene content of the polyether polyol(s) at least 20% but less than 60% by weight and may be 30% to 50% by weight. These percentages are based on the combined weight of oxyalkylene groups present in the polyether polyol (when only one is present) or the mixture (when two or more are present) or, equivalently, the weight proportions of ethylene oxide and propylene oxide polymerized in making the polyether polyol(s). Because the average oxyethylene and oxypropylene contents fall within the foregoing ranges, a mixture of two or more polyether polyols is required when a homopolymer or ethylene oxide or a homopolymer of propylene oxide is used.

When the at least one polyether polyol(s) has an average hydroxyl equivalent weight of 200 or more, the isocyanate-reactive materials further include at least one crosslinker. In such cases, the crosslinker is present in an amount such that the equivalent weight of the polyether polyol(s) and the crosslinker(s) combined is less than 200. The polyether polyol(s) constitute at least 70% of the total weight of isocyanate-reaction materials even when the crosslinker is present. The equivalent weight of the polyether polyol(s) and crosslinker combined is calculated by dividing their combined weight by the sum of the number of equivalents of each.

The crosslinker is optional in embodiments in which the average hydroxyl equivalent weight of the polyether polyol(s) is less than 200.

A crosslinker, for purposes of this invention, is a compound that contains 3 or more hydroxyl groups per molecule and has a hydroxyl equivalent weight of less than 100. Examples include glycerin, trimethylolpropane, trimethylolethane, pentaerythritol, erythritol, and the like as well as alkoxylates thereof having a hydroxyl equivalent weight of less than 100.

The remainder of the isocyanate-reactive materials may include, for example, one or more other polyether polyols having a hydroxyl equivalent weight of at least 100 and being different from those described above (such as, for example, polyether diols or polyethers having equivalent weights of 400 or more); one or more diols having a hydroxyl equivalent weight of less than 100; one or more polyester polyols, water; and one or more primary and/or secondary amino compounds. The remainder of the isocyanate-reactive materials may include one or more solvents or dispersants carried in with the catalysts or other ingredients.

Diols having a hydroxyl equivalent weight of less than 100 include, for example, ethylene glycol, diethylene glycol, triethylene glycol, propylene glycol, dipropylene glycol, cyclohexanedimethanol and the like. If present at all, these may constitute, for example, at least 0.5%, or at least 1% of the weight of the isocyanate-reactive materials and, for example, up to 20%, up to 15%, up to 10%, up to 5% or up to 3% thereof.

Water, if present, constitutes no more than 0.5% of the weight of the isocyanate-reactive materials, as the water reacts with isocyanate groups, consuming them so fewer remain available to trimerize to form isocyanurate groups. A preferred amount is 0 to 0.35% by weight.

A polyester polyol, if present, constitutes less than 25% of the weight of the isocyanate-reactive components. It may constitute no more than 20%, no more than 10% or no more than 5% thereof. The polyester polyol may be absent.

The physical blowing agent may be, for example, liquid or supercritical carbon dioxide and/or an organic compound having a boiling temperature of −5 to 60° C., especially 10 to 60° C., such as a hydrocarbon, hydrofluorocarbon, fluorocarbon, fluorochlorocarbon, hydrofluorochlorocarbon, hydrochlorofluoroolefin, hydrofluoroolefin or dialkyl ether. Hydrocarbons such as n-butane, isobutane, n-pentane, isopentane and cyclopentane are all suitable, as are mixtures of any two or more thereof. The physical blowing agent is not reactive toward isocyanate groups under the conditions of the foaming reaction.

The blowing agent is used in an amount sufficient to produce a foam having a foam density as described below. A suitable amount is, for example, 20 to 50 parts, especially 35 to 45 parts, by weight per 100 parts by weight of the isocyanate-reactive materials.

The polyisocyanate component includes one or more aromatic polyisocyanates. The aromatic polyisocyanate, or aromatic polyisocyanates if more than one, have a number average isocyanate functionality of at least 2.7 and an average isocyanate equivalent weight of up to 150. The number average functionality preferably is 2.7 to 4 and more preferably 2.7 to 3.5. The average isocyanate equivalent weight preferably is 125 to 150 or 130 to 145. Exemplary aromatic polyisocyanates include one or more of m-phenylene diisocyanate, 2,4- and/or 2,6-toluene diisocyanate (TDI), the various isomers of diphenylmethanediisocyanate (MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4''-triphenylmethane triisocyanate, a polymethylene polyphenylisocyanate, hydrogenated polymethylene polyphenylisocyanates, toluene-2,4,6-triisocyanate, and 4,4'-dimethyl diphenylmethane-2,2',5,5'-tetraisocyanate. Any of the foregoing polyisocyanates that are difunctional will be used in admixture with one or more other polyisocyanates that are at least trifunctional. A preferred polyisocyanate is a polymeric MDI product that includes MDI and one or more polymethylene polyphenylisocyanates. The preferred polymeric MDI product has a number average functionality of 2.7 to 3.5 and an isocyanate equivalent weight of 130 to 145.

The polyisocyanate component is provided in an amount such that the isocyanate index is 200 to 400, especially 200 to 300. "Isocyanate index" is 100 times the ratio of isocyanate groups to isocyanate-reactive groups provided to the reaction mixture that forms the polyurethane-polyisocyanurate foam. Water is counted as having two isocyanate-reactive groups. All primary amino groups (if any) are counted as a single isocyanate-reactive group even though such groups potentially can react difunctionally toward isocyanate groups.

The foam-stabilizing surfactant helps to stabilize the foaming reaction mixture against collapse until it has hardened enough to maintain a cellular structure.

Suitable surfactants include nonionic polyether surfactants such as ethylene oxide/propylene oxide and ethylene oxide/butylene oxide block copolymers. Among these are, for example, Vorasurf® 504 from The Dow Chemical Company. It is less preferred to use anionic or cationic surfactants. Typically the surfactant is used at levels of 0.5 to 10 parts, especially from 2.5 to 7 parts, per 100 parts by weight of the isocyanate-reactive materials. As with the catalyst, the surfactant can be incorporated into either the isocyanate-reactive component or the isocyanate component, or both, but is most typically incorporated into the isocyanate-reactive component.

Examples of isocyanate trimerization catalysts include strong bases such as alkali metal phenolates, alkali metal alkoxides, alkali metal carboxylates, quaternary ammonium salts, and the like. Examples of such trimerization catalysts include sodium p-nonylphenolate, sodium p-octyl phenolate, sodium p-tert-butyl phenolate, sodium acetate, sodium 2-ethylhexanoate, sodium propionate, sodium butyrate, sodium octoate, potassium p-nonylphenolate, potassium p-octyl phenolate, potassium p-tert-butyl phenolate, potassium acetate, potassium 2-ethylhexanoate, potassium propionate, potassium butyrate, potassium octoate, trimethyl-2-hydroxypropylammonium carboxylate salts, and the like.

The reaction mixture contains 3 to 9 parts of the isocyanate trimerization catalyst per 100 parts by weight of isocyanate-reactive materials. A preferred amount is 4 to 8 parts and a more preferred amount is 4 to 7.5 parts on the same basis. The amount of catalyst is calculated on an active basis, i.e., without consideration of the weight of diluent and/or solvent as is often present in commercially available isocyanate trimerization catalyst products.

An advantage of the invention is that rapid curing and good property development is seen despite the presence of only these somewhat small amounts of isocyanate trimerization catalyst. The ability to use low catalyst levels provides several benefits. Lower amounts of catalyst residues are present in the product, which is beneficial because these residues may tend to catalyze depolymerization reactions and can leach from the product. Catalyst costs are decreased as well.

A catalyst for the reaction of isocyanate groups toward water and/or alcohol groups is present. Examples of such catalysts include tertiary amines; tin carboxylates; organotin compounds; tertiary phosphines; various metal chelates; metal salts of strong acids, such as ferric chloride, stannic chloride, stannous chloride, antimony trichloride, bismuth nitrate and bismuth chloride; and the like. Tertiary amine and tin catalysts are generally preferred. These catalysts are typically used in an amount to provide a gel time of 20 seconds or less, preferably 5 to 15 seconds, and a tack-free time of 30 seconds or less, especially 8 to 20 seconds. Suitable amounts are, for example, 0.0015 to 5, preferably from 0.1 to 1.5, parts by weight per 100 parts by weight of the isocyanate-reactive materials. Tin-containing catalysts are typically used in amounts towards the low end of these ranges.

Representative tertiary amine catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis (dimethylaminoethyl)ether, bis(2-dimethylaminoethyl) ether, morpholine, 4,4'-(oxydi-2,1-ethanediyl)bis, triethylenediamine, pentamethyl diethylene triamine, dimethyl cyclohexyl amine, N-cetyl N,N-dimethyl amine, N-cocomorpholine, N,N-dimethyl aminomethyl N-methyl ethanol amine, N, N, N'-trimethyl-N'-hydroxyethyl bis(aminoethyl) ether, N,N-bis(3-dimethylaminopropyl)N-isopropanolamine, (N,N-dimethyl) amino-ethoxy ethanol, N, N, N', N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis (propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, 1,2-ethylene piperidine and methyl-hydroxyethyl piperazine.

Examples of useful tin-containing catalysts include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

Various optional ingredients may be included in the reaction mixture. A preferred optional ingredient is a flame retardant. Any flame retardant may be a solid or a liquid. Exemplary flame retardants include melamine, phosphorous compounds, halogen-containing phosphorous compounds such as tris(1-cholo-2-propyl) phosphate, aluminum containing compounds, brominated compounds, chlorinated compounds, and polyureas. When present, the amount of flame retardant may be at least 1 part, at least 3 parts or at least 5 parts by weight per 100 parts by weight of the isocyanate-reactive materials, and may be, for example, up to 50 parts, up to 25 parts or up to 15 parts by weight on the same basis.

The reaction mixture may contain one or more other optional components including, for example, fillers such as talc, clay, silica, calcium carbonate, graphite, glass, carbon black, and plastic (such as ABS) powders; fibers such as glass or other ceramics, carbon, metals, or polymers (such as polyamide or polypropylene); colorants; biocides; and preservatives.

The polyurethane-polyisocyanurate foam is conveniently made by mixing the foregoing ingredients and allowing the polyisocyanates and isocyanate-reactive materials to react. The temperature is high enough that any liquid physical blowing agent volatilizes to form a blowing gas. Some or all of the ingredients except for the polyisocyanate(s) may be formulated into an isocyanate-reactive component that is then combined with the polyisocyanate component to produce the foam. Alternatively, the individual ingredients or various sub-combinations therefore may be brought separately to a mixhead where they are combined and dispensed to form the foam. The various components can be combined at a temperature of, for example 10 to 80° C. A preferred temperature is 15 to 50° C. or 20 to 40° C.

The isocyanate-reactive materials will react spontaneously with the polyisocyanate(s) at the aforementioned temperatures. Therefore, curing can be performed at any of the temperatures just mentioned, provided the temperature is high enough to volatilize any liquid physical blowing agent. For example, the components can be combined at such temperatures and then allowed to cure without application of heat. The reaction is generally exothermic, and so an exothermic temperature rise may take place during the cure. The exothermic heat of reaction may provide some or all of the heat needed to volatilize the physical blowing agent.

After mixing, the reaction mixture can be dispensed into a trough or onto a conveyor belt where it rises and cures to form the polyurethane-polyisocyanurate foam. The foam may rise unrestrained in at least the vertical direction.

The foam may subsequently be fabricated to cut it into specific geometries or into specific dimensions.

The polyurethane-polyisocyanurate foam preferably rises and cures to a foam density of 18 to 30 kg/m$^3$. A more preferred density is 22 to 30 kg/m$^3$, especially 25 to 29 kg/m$^3$. All foam densities mentioned herein are core densities as determined according to ASTM D-1622. The foam also preferably exhibits a compressive strength of at least 124 kPa (18 pounds/square inch), more preferably 124 to 210 kPa (18 to 30 pounds/square inch), as determined according to ASTM D-1621.

The polyurethane-polyisocyanurate foam may exhibit a k-factor, as determined according to ASTM C-518 using an average plate temperature of 24° C., of no greater than 29 mW/m-° K (0.2 BTU/hr-ft$^2$-° F.-in). The k-factor may be up to 26 mW/m-° K (0.18 BTU/hr-ft$^2$-° F.-in). The k-factor may be at least 20 mW/m-° K (0.14 BTU/hr-ft$^2$-° F.-in), at least 21.5 mW/m-° K (0.15 BTU/hr-ft$^2$-° F.-in) or at least 23 mW/m-° K (0.16 BTU/hr-ft$^2$-° F.-in).

The k-factor as measured using an average plate temperature of 4° C. may be within the aforementioned ranges. An advantage of the invention is that the k-factor at the 4° C. plate temperature is at most only slightly greater (such as at most 5% greater, preferably no more than 3% greater) than the k-factor as measured at the 24° C. plate temperature. The 4° C. k-factor often is equal to or even lower than the 24° C. k-factor. This is a significant advantage of the invention, particularly in building applications in which the foam is called upon to provide thermal insulation over a wide range of exterior temperatures.

The polyurethane-polyisocyanurate foam is useful, by itself or together with one or more facing layers, as boardstock that can be used as thermal insulations. Specific applications include building insulation (such as for insulating roofs, ceilings, walls and/or floors), underlayment for sidewalks and/or roadways and thermal insulation for walk-in refrigerators or freezers. The foam in such boardstock may have a thickness of 25 to 300 mm. The boardstock may have a width of for example, 30 to 300 cm.

One or both major surfaces of the polyurethane-polyisocyanurate foam may be covered with a facing layer such as, for example, a metal foil, kraft or other paper, a fiber-reinforced paper, a metal foil-paper composite layer, a plastic film, or the like. Each facing layer preferably has a thickness of at most 1 mm, preferably up to 0.5 mm.

The following examples are provided to illustrate the invention, but are not intended to limit the scope thereof. All parts and percentages are by weight unless otherwise indicated.

EXAMPLES 1-2 AND COMPARATIVE SAMPLES A-B

Comparative Sample A below is a reference polyester polyol-based foam. Polyurethane-polyisocyanurate foams Examples 1 and 2 and Comparative Sample B are made from the formulations set forth in Table 1 below. The amount of catalyst in each case is selected to attempt to bring the gel time into the range of 7 to 10 seconds.

Polyol A is a polyether made by polymerizing a mixture of 66% by weight ethylene oxide and 34% by weight propylene oxide onto glycerin to produce a polyether polyol having a nominal hydroxyl functionality of 3 and a hydroxyl equivalent weight of 150.

Polyol B is a polyether made by polymerizing a mixture of 66% by weight ethylene oxide and 34% by weight propylene oxide onto glycerin to produce a polyether polyol having a nominal hydroxyl functionality of 3 and a hydroxyl equivalent weight of 334.

Polyol C is a polyether made by homopolymerizing ethylene oxide onto glycerin to produce a polyether polyol having a nominal hydroxyl functionality of 3 and a hydroxyl equivalent weight of 133.

Polyol D is a polyether made by homopolymerizing propylene oxide onto glycerin to produce a polyether polyol having a nominal hydroxyl functionality of 3 and a hydroxyl equivalent weight of 150.

Polyol E is a polyether made by polymerizing a mixture of 66% by weight ethylene oxide and 34% by weight propylene oxide onto glycerin to produce a polyether polyol having a nominal hydroxyl functionality of 3 and a hydroxyl equivalent weight of 200.

The Polyester Polyol is an aromatic polyester polyol having a nominal hydroxyl functionality of 2 and a hydroxyl equivalent weight of about 240. It is sold as Stepanpol® PS-2352 by Stepan Company.

TCPP is tris(1-chloro-2-propyl)phosphate.

Trimerization Catalyst A is a solution of 70% potassium octoate in 30% diethylene glycol.

Trimerization Catalyst B is a solution of 70% potassium acetate in 30% ethylene glycol.

The Urethane Catalyst is a commercially available pentamethyl diethylene triamine.

The surfactant is a non-ionic polyether surfactant sold commercially available as Vorasurf™ 504 from The Dow Chemical Company.

The Isocyanate is a polymeric MDI having an isocyanate equivalent weight of 136.5 and an isocyanate functionality of 3.0.

TABLE 1

|  | Parts by Weight | | |
|---|---|---|---|
| Ingredient | Comp. B* | Ex. 1 | Ex. 2 |
| Polyol A | 50 | 75 | 100 |
| Polyester Polyol | 50 | 25 | 0 |
| TCPP | 10 | 10 | 10 |
| Trimerization Catalyst A | 1.93 | 1.82 | 1.82 |
| Trimerization Catalyst B | 6.74 | 6.36 | 6.36 |
| Urethane Catalyst | 0.34 | 0.32 | 0.32 |
| Surfactant | 5 | 5 | 5 |
| Water | 0.25 | 0.25 | 0.25 |
| n-Pentane | 31.1 | 32.9 | 34.9 |
| Total Weight Isocyanate-Reactive Materials[1] | 102.85 | 102.7 | 102.7 |
| Wt. -% Polyester Polyol[2] | 48.6 | 24.3 | 0 |
| Wt. -% Trimerization Catalyst[3] | 5.9 | 5.6 | 5.6 |
| Isocyanate Index | 250 | 250 | 250 |

*Comparative. [1]Includes weight of polyol(s), water and isocyanate-reactive solvent in the trimerization catalyst products. [2]Based on total weight of isocyanate-reactive materials. [3]Weight of active catalysts divided by total weight of isocyanate-reactive materials, including the weight of the solvents in the catalysts.

The foam in each case is made by blending all ingredients except the polyisocyanate to form a polyol component. The temperature of the polyol component and the polyisocyanate composition each are separately adjusted to within the range of 20-25° C. The components are then mixed through an impingement mixing machine and dispensed into a 28×28× 15 cm lidded wooden box and cured without applying additional heat. Gel and tack-free time are determined by pressing a wooden tongue depressor onto the surface of the reaction mixture. Gel time is the time at which polymer strings from when the tongue depressor is removed from the surface. Tack-free time is the time at which the reaction mixture no longer leaves a residue on the tongue depressor. The foam is allowed to cure and conditioned for 24 hours at room temperature and ambient humidity before foam property testing. Core foam densities are obtained according to ASTM D-1622. Compressive strength is measured according to ASTM D-1621. K-factor is determined in accordance with ASTM C-518. Results are as indicated in Table 2 below.

TABLE 2

| Property | Comp. A* | Comp. B* | Ex. 1 | Ex. 2 |
|---|---|---|---|---|
| Wt. % EO in polyether polyol(s)[1] |  | 66 | 66 | 66 |
| Equivalent Weight, polyether polyol |  | 150 | 150 | 150 |
| Wt. % Polyester Polyol[2] | >25% | 48.6 | 24.3 | 0 |
| Wt. % Trimerization Catalyst[3] |  | 5.9 | 5.6 | 5.6 |
| Gel time, s |  | 8 | 7 | 8 |
| Tack-free time, s |  | 13 | 10 | 12 |
| Density, kg/m³ | 27.1 | 24.8 | 28.0 | 28.7 |
| k-factor, 24°C., mW/m-° K. | 23.7 | 24.6 | 23.6 | 24.0 |
| k-factor, 4° C., mW-m-° K. | 26.6 | 27.2 | 24.5 | 23.1 |
| % Change[4] | +12% | +10.5% | +3.7% | −3.8% |
| Compressive Strength, kPa | 135 | 128 | 135 | 145 |

Comparative. N.D.-not done. [1]Weight of oxyethylene as percentage of the weight of all alkylene oxides polymerized in making the polyether polyol (s). [2]Based on total weight of all isocyanate-reactive materials, including the solvents contained in the catalysts. [3]The weight of the active trimerization catalysts divided by the total weight of the isocyanate-reactive materials, including the solvents in the catalyst products. [4]Calculated as (24° C. k-factor-4° C. k-factor) ÷ 24° C. k-factor.

Comparative Sample A illustrates the problem with conventional polyurethane-polyisocyanurate foams made using a large proportion of a polyester polyol. Foam density and compressive strengths are acceptable, as is the k-factor at 24° C., but the 4° C. k-factor is 12% greater than the k-factor at 24° C.

In Comparative Sample B, the polyether polyol has the proper equivalent weight, functionality and ethylene oxide content, but at this high level of polyester polyol a large loss of k-factor is seen at the 4° C. average plate temperatures. The absolute values also are high at both the 24° C. and 4° C. average plate temperatures.

Example 1 and Example 2 further demonstrate the benefit of reducing the amount of polyester polyol. When the amount of polyester polyol is reduced to slightly less than 25% (Ex. 1), the k-factor at 4° C. is only slightly increased compared to the 24° C. k-factor. Eliminating the polyester polyol (Ex. 2) causes the 4° C. k-factor to actually become lower than the 24° C. k-factor. The 24° C. k-factors for each of Examples 1 and 2 are comparable to those of Comp. Sample A and better than Comp. Sample B.

Note also that the compressive strengths of Examples 1 and 2 are at least equal to that of Comp. Sample A.

EXAMPLES 3-4 AND COMPARATIVE SAMPLES C-E

Polyurethane-polyisocyanurate foams are made from the formulations set forth in Table 3 below, and tested in the same manner as in previous examples. Results of the testing are as indicated in Table 4. The results from testing Example 2 above are repeated in Table 4.

TABLE 3

| Ingredient | Parts by Weight | | | | | |
|---|---|---|---|---|---|---|
| | Comp. C* | Comp. D* | Ex. 3 | Ex. 2 | Ex. 4 | Comp. E* |
| Polyol A | 0 | 60 | 75.8 | 100 | 60 | 0 |
| Polyol C | 0 | 0 | 0 | 0 | 40 | 100 |
| Polyol D | 100 | 40 | 24.2 | 0 | 0 | 0 |
| Polyol E | 0 | 0 | 0 | 0 | 0 | 0 |
| TCPP | 10 | 10 | 10 | 10 | 10 | 10 |
| Trimerization Catalyst A | 4.55 | 3.21 | 2.30 | 1.82 | 1.93 | 1.93 |
| Trimerization Catalyst B | 15.91 | 11.23 | 8.05 | 6.36 | 6.74 | 6.74 |
| Urethane Catalyst | 0.80 | 0.56 | 0.40 | 0.32 | 0.34 | 0.34 |
| Surfactant | 5 | 5 | 5 | 5 | 5 | 5 |
| Water | 0.25 | 0.25 | 0.25 | 0.25 | 0.25 | 0.25 |
| n-Pentane | 39.6 | 37.3 | 35.75 | 34.9 | 36.2 | 28.1 |
| Total Weight Isocyanate-Reactive Materials[1] | 106.39 | 104.58 | 103.36 | 102.7 | 102.85 | 102.85 |
| Wt. -% Trimerization Catalyst[3] | 13.5 | 9.7 | 7.0 | 5.6 | 5.9 | 5.9 |
| Isocyanate Index | 250 | 250 | 250 | 250 | 250 | 250 |

*Comparative. [1]Includes weight of polyol(s), water and isocyanate-reactive solvent in the trimerization catalyst products. [2]Weight of active catalysts divided by total weight of isocyanate-reactive materials, including the weight of the solvents in the catalysts.

TABLE 4

| Property | Comp. C* | Comp. D* | Ex. 3 | Ex. 2 | Ex. 4 | Comp. E* |
|---|---|---|---|---|---|---|
| Wt. % EO in polyether polyol[1] | 0 | 40 | 50 | 66 | 78.4 | 100 |
| Average Equivalent Weight, polyether polyol | 150 | 150 | 150 | 150 | 143 | 133 |
| Wt. % Trimerization Catalyst[2] | 13.5 | 9.7 | 7.0 | 5.6 | 5.9 | 5.9 |
| Gel time, s | 9 | 7 | 8 | 8 | 7 | 15 |
| Tack-free time, s | 12 | 10 | 12 | 12 | 10 | 17 |
| Density, kg/m³ | 24.4 | 28.4 | 28.2 | 28.7 | 27.7 | 40 |
| k-factor, 24° C., mW/m-° K. | 24.0 | 24.9 | 24.7 | 24.0 | 26.9 | 23.5 |
| k-factor, 4° C., mW-m-° K. | 24.5 | 25.6 | 25.1 | 23.1 | 27.2 | N.D. |
| % Change[3] | +1.9% | +3.0% | −1.9% | −3.8% | +1.1% | N.D. |
| Compressive Strength, kPa | 172 | 132 | 139 | 145 | 153 | 190 |

*Comparative. N.D.-not done. [1]Weight of oxyethylene as percentage of the weight of all alkylene oxides polymerized in making the polyether polyol(s). [2]The weight of the active trimerization catalyst divided by the total weight of the isocyanate-reactive materials, including the solvents in the catalyst products. [3]Calculated as (24° C. k-factor − 4° C. k-factor) ÷ 24° C. k-factor.

This set of experiments illustrates the effect of the average oxyethylene content in the polyether polyols that have a functionality of at least 3 and a hydroxyl equivalent weight of 100 to less than 400. At 0% oxyethylene content, very large amounts of trimerization catalyst are needed to produce foam at reasonable gel and tack free times. Increasing the oxyethylene content to just below 40% still requires almost 10% trimerization catalyst. When the oxyethylene content is 50 to 78.4%, much lower levels of trimerization catalyst are needed to produce good foam. In each case, the 4° C. k-factor is very close to or even below that at 24° C. When the oxyethylene content is 100%, foam density becomes very high.

EXAMPLE 5 AND COMPARATIVE SAMPLE F

Polyurethane-polyisocyanurate foams are made from the formulations set forth in Table 5 below and tested in the same manner as in previous examples. Results of the testing are as indicated in Table 6. The results from testing Example 2 above are repeated in Table 6.

TABLE 5

| | Parts by Weight | |
|---|---|---|
| Ingredient | Ex. 5 | Comp. F* |
| Polyol B | 87.5 | 0 |
| Polyol E | 0 | 100 |
| Glycerin (Crosslinker) | 12.5 | 0 |
| TCPP | 10 | 10 |
| Trimerization Catalyst A | 2.25 | 1.20 |
| Trimerization Catalyst B | 7.86 | 4.21 |
| Urethane Catalyst | 0.39 | 0.21 |
| Surfactant | 5 | 5 |
| Water | 0.25 | 0.25 |
| n-Pentane | 35.7 | 28.1 |
| Total Weight Isocyanate-Reactive Materials[1] | 103.28 | 101.87 |
| Wt. -% Trimerization Catalyst[2] | 6.85 | 3.7 |
| Isocyanate Index | 250 | 250 |

*Comparative. [1]Includes weight of polyol(s), water and isocyanate-reactive solvent in the trimerization catalyst products. [2]Weight of active catalysts divided by total weight of isocyanate-reactive materials, including the weight of the solvents in the catalysts.

TABLE 6

| Property | Ex. 5 | Ex. 2 | Comp. F* |
|---|---|---|---|
| Wt. % EO in polyether polyol[1] | 66 | 66 | 66 |
| Equivalent Weight, polyether polyol + crosslinker combined | 150 | 150 | 200 |
| Wt. % Trimerization Catalyst[2] | 6.85 | 5.6 | 3.7 |
| Gel time, s | 7 | 8 | 10 |
| Tack-free time, s | 9 | 12 | 15 |
| Density, kg/m³ | 25.3 | 28.7 | 26.6 |
| k-factor, 24° C., mW/m-° K. | 26.8 | 24.0 | 23.7 |
| k-factor, 4°C, mW-m-° K. | 26.4 | 23.1 | N.D. |
| % Change[3] | −1.1% | −3.8% | N.D. |
| Compressive Strength, kPa | 125 | 145 | 108 |

Comparative. N.D.-not done. [1]Weight of ethylene oxide as percentage of the weight of all alkylene oxides polymerized in making the polyether polyol. [2]The weight of the active trimerization catalyst divided by the total weight of the isocyanate-reactive materials, including the solvents in the catalyst products. [3]Calculated as (24° C. k-factor-4° C. k-factor) ÷ 24° C. k-factor.

Example 5 demonstrates that the beneficial effects of the invention are obtained using a polyether polyol of somewhat higher equivalent weight (334) if a crosslinker is provided such that the equivalent weight of the polyether and crosslinker combined is under 200. Some loss of compressive strength is seen in this case due to the presence of the higher equivalent weight material. Comp. Sample F shows the effect of having too high of a polyether polyol equivalent weight (without the additional presence of a crosslinker). The foam compressive strength decreases dramatically.

What is claimed is:

1. A polyurethane-polyisocyanurate foam that is a reaction product of a reaction mixture comprising one or more isocyanate-reactive materials, a polyisocyanate component, a physical blowing agent, a foam-stabilizing surfactant, at least one trimerization catalyst and at least one catalyst for the reaction of an isocyanate group towards water, wherein:
   a) greater than 70% by weight of the one or more isocyanate-reactive materials is at least one polyether polyol having a hydroxyl equivalent functionality of 3 and a hydroxyl equivalent weight of at least 100 but less than 400, wherein the at least one polyether polyol is selected from the group consisting of a copolymer of ethylene oxide and propylene oxide, a mixture of a homopolymer of propylene oxide and a homopolymer of ethylene oxide, or a mixture of a copolymer of ethylene oxide and propylene oxide with a homopolymer of ethylene oxide and/or a homopolymer of propylene oxide and the at least one polyether polyol has an average oxyethylene content of greater than 40% but less than 80% by weight and correspondingly an average oxypropylene content at least 20% but less than 60% by weight based on the combined weight of oxyalkylene groups present in the at least one polyether polyol, provided that when the at least one polyether polyol has an average hydroxyl equivalent weight greater than 200, the one or more isocyanate-reactive materials further include at least one crosslinker having a hydroxyl functionality of at least 3 and a hydroxyl equivalent weight of less than 100 such that the equivalent weight of the at least one polyether polyol and the at least one crosslinker combined is less than 200;
   b) less than 25% by weight of the one or more isocyanate-reactive materials is a polyester polyol;
   c) water constitutes no more than 0.5% of the weight of the one or more isocyanate-reactive materials;
   d) the polyisocyanate component includes one or more aromatic polyisocyanates, the one or more aromatic polyisocyanates having an average isocyanate functionality of at least 2.7 and an average isocyanate equivalent weight of up to 150;
   e) the isocyanate index is 200 to 400; and
   f) the reaction mixture contains 3 to 9 parts by weight, per 100 parts by weight of the one or more isocyanate-reactive materials, of the at least one trimerization catalyst.

2. The polyurethane-polyisocyanurate foam of claim 1 which has a foam density of 20 to 30 kg/m³.

3. The polyurethane-polyisocyanurate foam of claim 2 which exhibits a k-factor, as measured according to ASTM C-518, that at 4° C. average plate temperature is equal to or lower than at 24° C. average plate temperature.

4. The polyurethane-polyisocyanurate foam of claim 3 wherein at least 90% by weight of the one or more isocyanate-reactive materials is the at least one polyether polyol.

5. The polyurethane-polyisocyanurate foam of claim 4 wherein at least 95% by weight of the one or more isocyanate-reactive materials is the at least one polyether polyol.

6. The polyurethane-polyisocyanurate foam of claim 3 wherein no more than 5% by weight of the one or more isocyanate-reactive materials is a polyester polyol.

7. The polyurethane-polyisocyanurate foam of claim 3 wherein the one or more isocyanate-reactive materials are devoid of a polyester polyol.

8. The polyurethane-polyisocyanurate foam of claim 3 wherein the at least one trimerization catalyst includes at least one alkali metal carboxylate salt.

9. The polyurethane-polyisocyanurate foam of claim 8 wherein the reaction mixture contains 4 to 8 parts by weight, per 100 parts by weight of the isocyanate-reactive materials, of the at least one alkali metal carboxylate salt.

10. The polyurethane-polyisocyanurate foam of claim 8 wherein the reaction mixture includes at least one flame retardant.

11. A boardstock comprising the polyurethane-polyisocyanurate foam of claim 1 and a facer material applied to at least one surface of the polyurethane-polyisocyanurate foam.

\* \* \* \* \*